(12) United States Patent
Papadopoulos

(10) Patent No.: US 9,400,729 B2
(45) Date of Patent: Jul. 26, 2016

(54) SYSTEM AND METHOD FOR DETERMINING TOPOLOGY OF MONITORED ENTITIES

(75) Inventor: Constantinos Papadopoulos, Nicosia Strovolos (CY)

(73) Assignee: Hewlett Packard Enterprise Development LP, Houston, TX (US)

( * ) Notice: Subject to any disclaimer, the term of this patent is extended or adjusted under 35 U.S.C. 154(b) by 1225 days.

(21) Appl. No.: 12/916,356

(22) Filed: Oct. 29, 2010

(65) Prior Publication Data

US 2012/0110160 A1 May 3, 2012

(51) Int. Cl.
*G06F 15/173* (2006.01)
*G06F 11/30* (2006.01)
*H04L 12/24* (2006.01)

(52) U.S. Cl.
CPC ........ *G06F 11/3051* (2013.01); *G06F 11/3006* (2013.01); *H04L 41/12* (2013.01)

(58) Field of Classification Search
USPC ............................ 709/224; 714/57, E11.204
See application file for complete search history.

(56) References Cited

U.S. PATENT DOCUMENTS

| | | | |
|---|---|---|---|
| 5,964,837 A * | 10/1999 | Chao et al. ................ | 709/224 |
| 6,697,338 B1 | 2/2004 | Breitbart et al. | |
| 2002/0103896 A1 | 8/2002 | Von Klopp Lemon | |
| 2005/0044215 A1 | 2/2005 | Cohen et al. | |
| 2007/0283194 A1 * | 12/2007 | Villella et al. ................ | 714/57 |
| 2009/0172653 A1 | 7/2009 | Elliott | |
| 2010/0318976 A1 | 12/2010 | Everly et al. | |

FOREIGN PATENT DOCUMENTS

WO    WO 2012/002955    1/2012

OTHER PUBLICATIONS

International Search Report for International Application No. PCT/US2010/040600 mailed on Mar. 31, 2011.
Barbon et al., Run-Time Monitoring of Instances and Classes of Web Service Compositions, In: IEEE International Conference on Web Services, 2006.
Umesh Bellur, A Methodology & Tool for Determining Inter-component Dependencies Dynamically in J2EE Environments School of Information Technology, IIT Bombay—Third International Conference on Autonomic and Autonomous Systems (ICAS'07). 2007.
Meghan Allen et al., "NAV—Network Analysis Visualization" University of British Columbia; Department of Computer Science.
NetCrunch 6 Features (available at http://www.adremsoft.com/netcrunch/features/network-maps) AdRem Software.
NAV features at a glance (available at http://metanav.uninett.no/navfeatures), printed on Jun. 30, 2010.

* cited by examiner

*Primary Examiner* — Yves Dalencourt
(74) *Attorney, Agent, or Firm* — Hewlett Packard Enterprise Patent Department

(57) ABSTRACT

Devices and methods may allow for a first process associated with a probe process to receive a message transmitted across a network from a second process, the message including data and an identifier for the second process. The probe process may transmit identifiers for the first and second process to a server. A server may receive a message from a probe process including entity identifiers, and update a record recording a connection between the entities.

14 Claims, 5 Drawing Sheets

SYSTEM AND METHOD FOR DETERMINING TOPOLOGY OF MONITORED ENTITIES

BACKGROUND

Networks used by enterprises may connect many entities (e.g., thousands) such as applications, web browsers, database management systems (DBMSs), servers, clients, routers and firewalls. These entities may generate many thousands of messages such as server requests.

Applications exist which try to model networks or determine topologies, and to determine which entities are connected to or communicating with which other entities. However, this is a very complex task.

Existing tools use ad-hoc and unreliable methods, working only partially. Existing tools produce too many false negatives (not connecting, in a model, entities that are in fact communicating with each other) and false positives (connecting, in a model, entities that are not communicating with each other). In addition, some existing tools need continual maintenance, in particular when new communications protocols or other technology is added to a network.

Existing tools may include a probe (e.g., a process associated with and/or code injected into an entity which may monitor the entity for performance or other reasons) for each of a set of entities communicating with each other. The probe may report, e.g., using a string, to a central process responsible for matching communications among entities. If identifiers in the string match or are matched, the central process may deem that the entities are communicating with each other. Each entity, via a separate probe, may construct a string and pass it to the central process.

Figure 1:
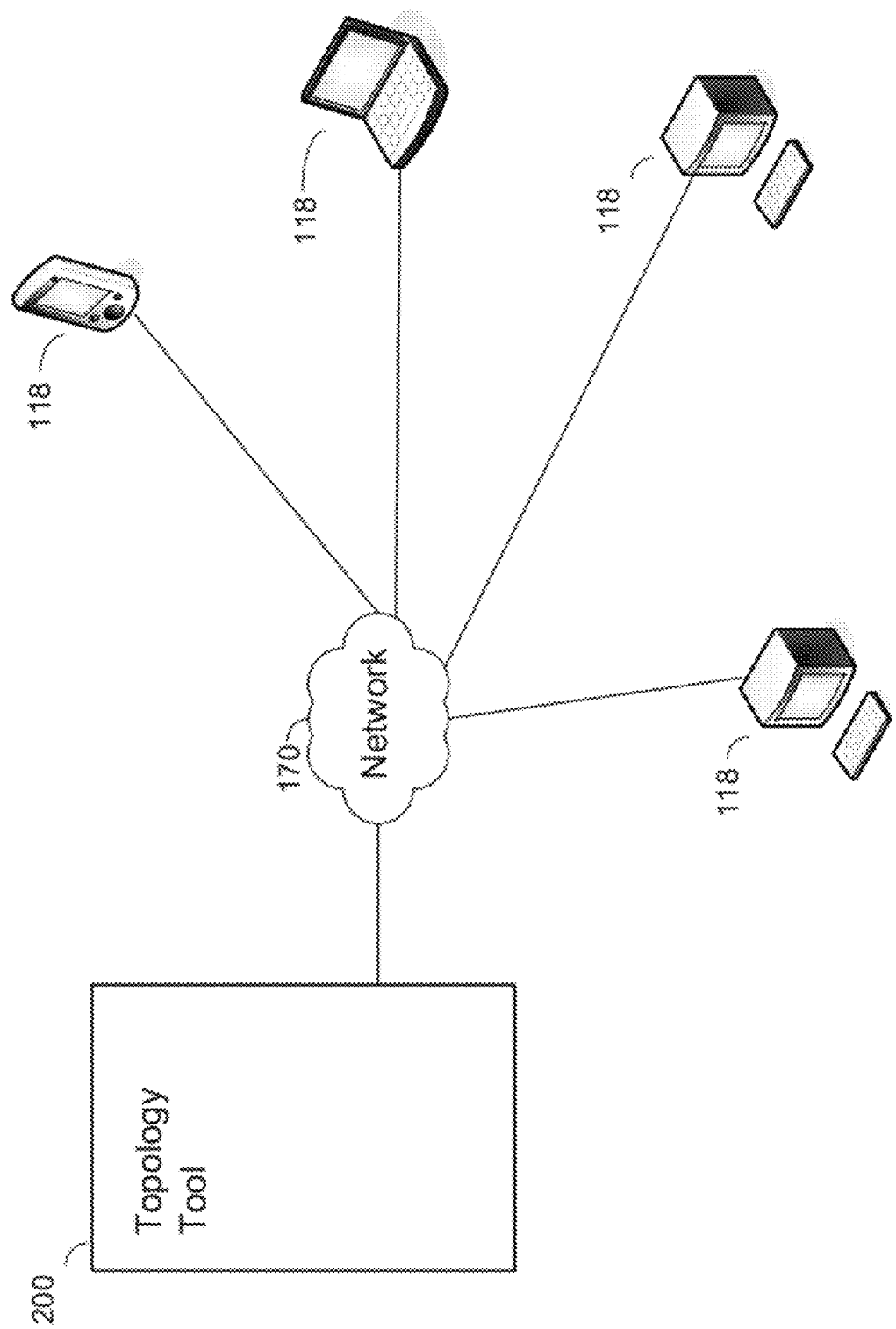
FIG. 1 is a schematic diagram of a system according to embodiments of the invention.

Reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, throughout the specification discussions utilizing terms such as "processing", "computing", "storing", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In one embodiment, for an entity (e.g. process, web service, application, device, router, etc.) monitored by a monitoring tool (e.g. a probe) for performance or other reasons, the monitoring tool or another process may define an identifier such as a primary key (possibly for each type of entity). A primary key may be made up of subfields such as identifier fields. When an entity or probe reports data to a monitoring server, such as latencies, etc., it also may report its primary key. This reporting may occur independently by each entity, regardless of whether an entity communicates with a different entity. The primary key may be a combination of elements or identifier fields such as the preexisting name of the entity, a specific instance of a process, or other data, such as the port number that the entity executes on, or the queue name. The primary key or other identifier may be unique across a network. In different implementations what is "unique" may be different, and the identifiers typically are unique according to the definition of a central process (e.g. a topology tool). For the same entity, different monitoring or probe processes may have different definitions of uniqueness (e.g. use different primary keys).

A system and method according to an embodiment of the invention may create a topology (e.g., a network topology) or map by receiving messages from entities or processes, or probe code associated with or integrated with entities. In one embodiment, all or part of a probe is part of the monitored entity; for example the probe is injected code. The messages may include for example identifier strings or other data. While in some embodiments the entities operate across a network, and a network topology may be created, in other embodiments, the entities need not operate on a network, and a topology may be created for other monitored entities. Embodiments of the present invention may allow topologies to be created for, for example, server request SR1 which calls another server request SR2 within the same application server, not using a network. The messages may include names or identifiers, e.g. unique identifiers such as primary keys, each associated with or describing one of a source or sender entity and a destination or receiver entity (where the source entity is sending or transmitting a message to, is connected to, or is communicating with, the destination entity). A correlation string may be created when a probe (associated with a source entity A) includes an identifier such as a primary key for entity A in a message sent to a destination entity B. A second probe (associated with entity B) extracts the identifier for entity A from the incoming correlation string, creates or computes an identifier such as a primary key for entity B and creates a message to send to a central process. The message may include the primary keys of entities A and B. When entity A communicates with entity B, the unique name for entity A may be sent from entity A to entity B, and the probe for entity B may report both names to a central server or central computing device, which uses the unique names to create connection data (e.g., data indicating that the entities are communicating with each other) to create a topology (e.g., a network topology).

In most embodiments, the specific choice of primary key or other identifier is not relevant to the functionality. However, the primary key is typically chosen to uniquely identify an entity. In one embodiment, the name or identifier, e.g. a primary key, is unique because it is based at least in part on the name or identifier that the entity itself uses to refer to itself (e.g., a preexisting name or identifier), and/or because the identifier includes multiple items of information or identifier fields. For example, even if two entities have the same process names (e.g., "Internet Explorer") combining these names with other information identifying the process (e.g., port, queue, hardware host on which the process is executed, etc.) may produce a unique identifier. In some embodiments, the same program or application (or instance of a program or application), if it communicates in a different manner or at a different time (e.g., associates with a different queue or port) may be considered a different entity. The choice of primary keys may be completely up to the monitoring tool (e.g., probe), depending on how it (or the person who configures it) wants to model a given entity.

Embodiments of the present invention may collect information regarding communications among more than two entities or involving two or more hops. For example, entity A may send a message to entity B including a primary key for entity A. Entity B may send the pair of primary keys for entities A and B to a central server. Entity B may send a message to entity C including a primary key for entity B. Entity C may send the pair of primary keys for entities B and C to a central server. In some embodiments more than two identifiers such primary keys may be included in or assembled into a correlation string or message sent to a server; for example if there are more than two hops.

The central process, may, based on the identifiers received from probes, determine that the entities are connected or are communicating, or have formed a connection (e.g., a network connection). For example, the central process may look up or search for the entities in a database using the primary keys it received, and thus determine which entities are communicating.

FIG. 1 is a schematic diagram of a system according to embodiments of the invention. Topology tool 200 and entities 118 (e.g., network entities) may be connected to or interacting with each other and other units or entities by being connected to one or more data network(s) 170. Entities 118 may be connected or may communicate with each other by systems other than a network. Data network(s) 170 may allow the electronic and typically digital exchange of data by wire or wirelessly, and may include networks such as the Internet, various intranets, or other networks. Networks 170 may be all or partially within an enterprise or organization. Portions may be outside the enterprise or organization. In some embodiments, a network or network link that is "within" an enterprise may use infrastructure not controlled by the enterprise, such as in the case of entities belonging to an enterprise communicating via the public Internet, securely or not.

Entities 118 may be or include processes and/or devices (e.g., device 100, FIG. 2) such as applications, web services, web browsers, DBMSs, servers, clients, hardware such as workstations, servers, personal computers (PCs), portable computing devices such as personal digital assistants, laptops, cellular telephones, routers, servers, storage devices, and firewalls. Entities 118 may be processes executed by devices (e.g., device 100), such as in the case of software or code executed by a processor. In some embodiments a "processor" may include more than one processor—e.g., a multi-core processor, or more than one physically distinct processors. More than one entity may be executed on a single device, e.g., in the case of multiple applications executing on one PC.

Figure 2:
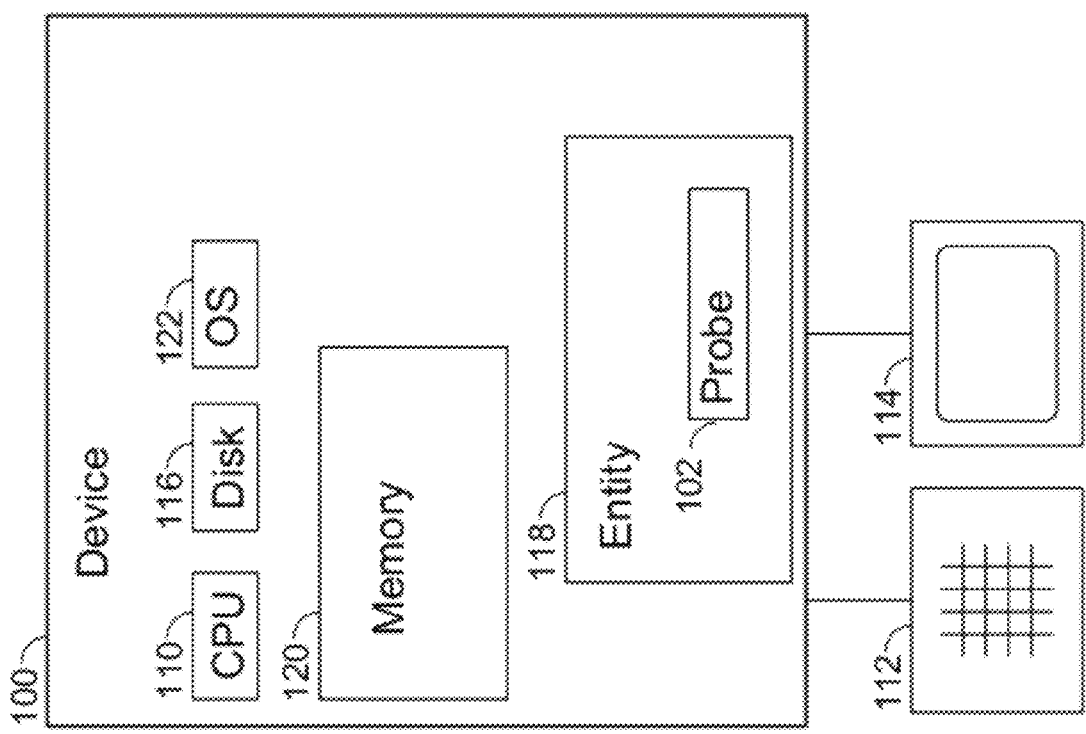
FIG. 2 is a schematic diagram of a device and an entity according to embodiments of the invention.

FIG. 2 is a schematic diagram of a device and an entity according to embodiments of the invention. Each device 100 may host one or more entities 118 (e.g., an Internet process, a database), and each device 100 may in some cases be considered a network entity (e.g., if device 100 is a router, a workstation, a PCs, etc). Each entity 118 may include or be associated with a probe process or code 102. Probe process or code 102 may be part of its associated entity; e.g., a probe process may be injected code. Therefore, the entity may in some embodiments be considered to include or act as a probe. In other embodiments all or part of process or code 102 may be separate from its associated entity. In one embodiment, probes and entities are matched one-to-one; that is each entity is associated with only one probe, and vice versa. In other embodiments, one-to-one matching need not be used. Each entity 118 and probe 102 may be included on or may be executed on device 100 which may include, for example, a processor or controller 110 (which may include more than one processor or controller), one or more memories 120, user input device(s) 112 (e.g., keyboards, pointing devices such as mice, etc.), user output device(s) 114 such as monitors or printers, and mass or long term storage device(s) 116 such as hard disk drives. An operating system (OS) 122 may control aspects of the operation of device 100 or processes executed on device 100. An entity 118 may be for example executed on or by processor 110, and may be code or software stored in memory 120 or long term storage device 116. Different entities and different devices may have different structures.

A probe 102 may monitor an entity 118. Probe 102 may, when an associated entity is sending a message to another entity, add to the message a correlation string (e.g. including a primary key) or other data identifying the entity. Probe 102 may, when an associated or monitored entity receives a message, extract the identifier from the incoming correlation string, and also calculate its own identifier, thus having a pair of identifiers (e.g. primary keys) to subsequently report to a server.

A probe 102 may be associated with or operating on each entity 118. In the case that more than one entity 118 is executed on a single device, e.g., more than one probe 102 may be executed on that device (e.g., one probe per entity). There may also be cases where a single probe is associated with multiple entities. For example, if the entity is a server request executing within an application server, then all the server requests within the application server may be monitored by the same probe. In one embodiment, code or software associated with or part of a probe 102 is injected or included within an entity 118 (e.g. an application) with which the probe 102 is associated. In other embodiments other probe methods may be used; for example probe functionality may be part of the code or software for an entity, or a plug-in, add-on or other addition. In other embodiments, a probe process may be more "separate" from an entity, and may simply monitor communications or messages sent to or sent from an entity, and act on those communications. Other methods may be used.

Probe 102 may start execution when the associated entity 118 starts execution, and may stop execution when the associated entity 118 stops execution. In one embodiment, entity 118 may invoke instrumentation or other code which, when entity 118 starts execution, causes a specific probe 102 such as probe code to start execution as well. Typically, a probe 102 is executed on the same hardware device as its associated entity 118, but this need not be the case. For example, a probe process 102 may monitor and add to communications of an associated entity 118 while executing on a different device and monitoring message traffic from and to the entity 118. Other methods of associating a probe and an entity may be used. For example, starting and stopping probes and entities may occur under the control of OS 122. Probes and entities need not start and stop at the same time.

Figure 3:
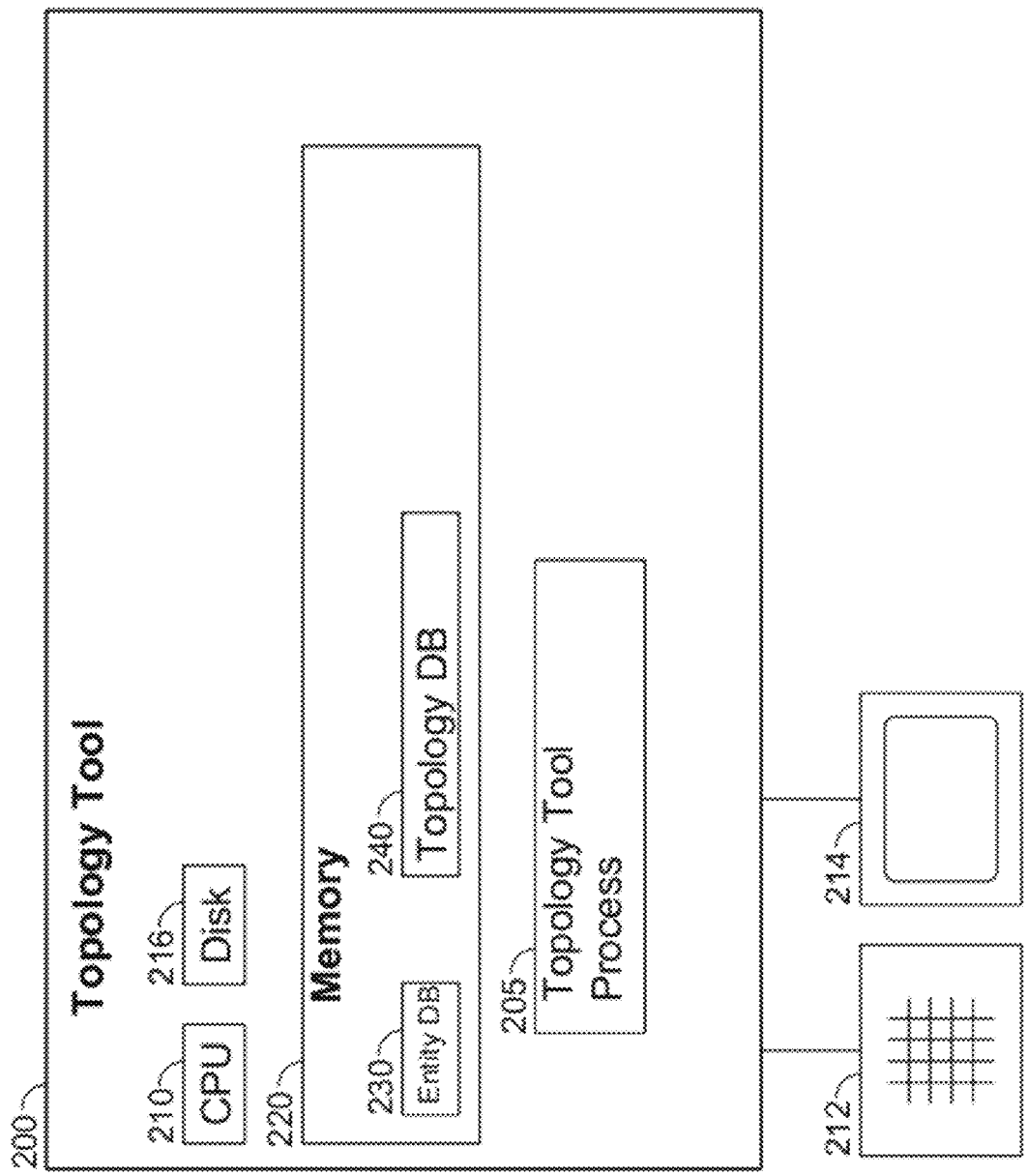
FIG. 3 is a schematic diagram of a topology tool according to embodiments of the invention.

FIG. 3 is a schematic diagram of a topology tool 200 according to embodiments of the invention. Topology tool 200 may be a central server or central computing device collecting communications data such as correlation strings, and producing a map or topology (e.g., a network map or network topology). Topology tool 200 may include, for example, a processor or controller 210 (which may include more than one processor or controller), one or more memories 220, user input device(s) 212 (e.g., keyboards, pointing devices such as mice, etc.), user output device(s) 214 such as monitors or printers, and mass or long term storage device(s) 216 such as hard disk drives. Topology tool 200 may execute topology tool process 205 to perform the functions of a topology tool; alternately all or part of the functions of a topology tool may be for example dedicated hardware. Topology tool process 205 may be executed on or by processor 210, and may be code or software stored in memory 220 or long term storage 216. In other embodiments different structures may be used to carry out the functionality of a topology tool. Topology tool 200 and topology tool process 205 may be distributed; for example several topology tool processes may be used.

Memory 220 or long term storage device 216 may store at times data such as identifiers (e.g. primary keys) or other data related to connections or communications between entities, and data derived from such data, such as topologies. For example, memory 220 may store an entity database 230, storing information on entities, and a topology database 240, storing a topology for example in the form of connections between entities, records of communications between entities, etc. The various data items shown may be stored in other locations, such as long term storage 216 or other locations. Different database structures may be used.

Figure 4:
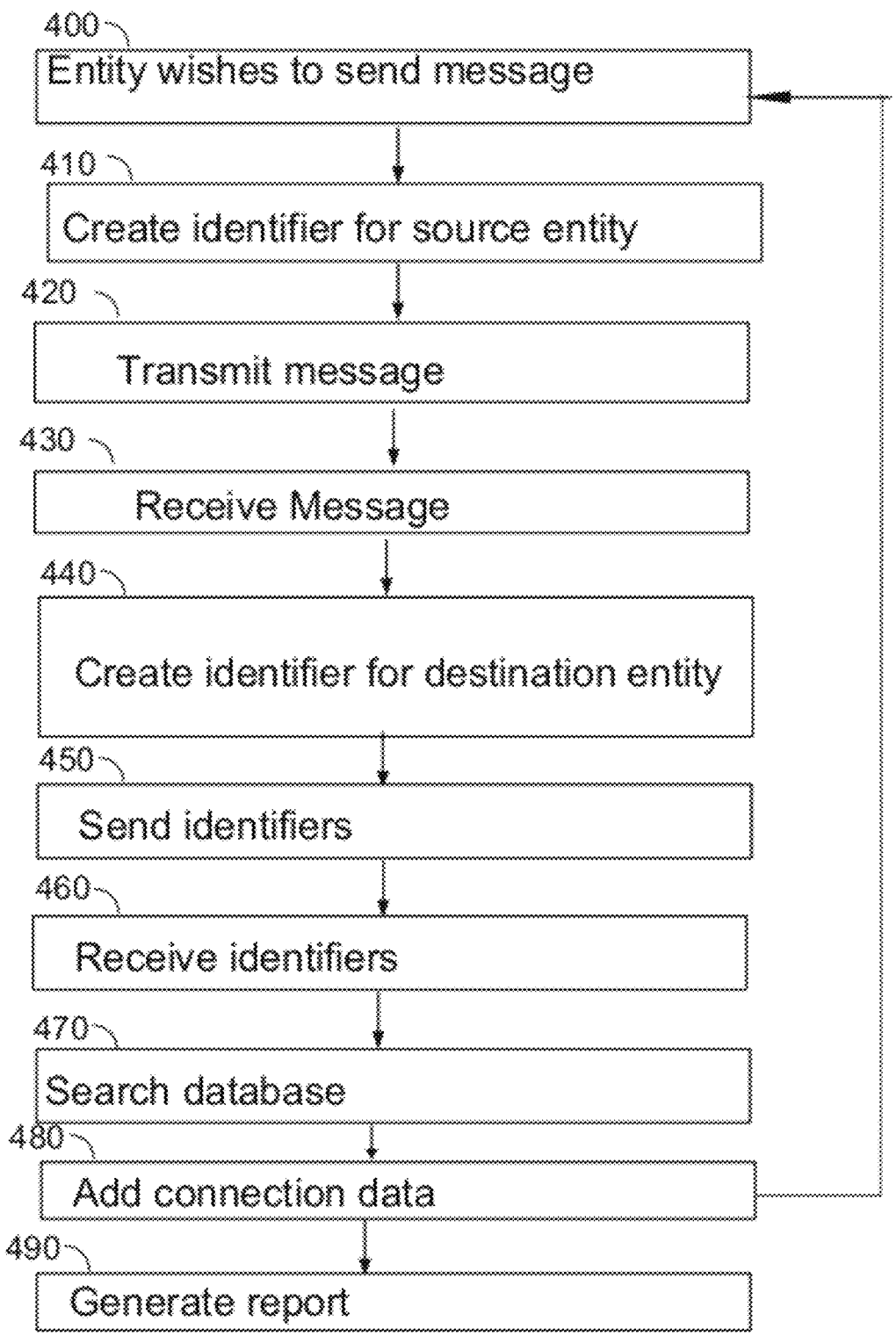
FIG. 4 is a flowchart depicting the operation of a method according to one embodiment of the invention.

FIG. 4 is a flowchart depicting the operation of a method according to one embodiment of the invention. While the embodiment depicted in FIG. 4 can be used with and carried out by the devices shown in FIGS. 1-3, including topology tool 200 and/or topology tool process 205, other systems or tools may carry out the operations of FIG. 4.

In operation 400, a source entity (e.g., being executed on a first device such as a device 100, or being a device 100) wishes to send a message to a destination entity (e.g., being executed on a second device such as a device 100, or being a device 100). The source and destination may be executed on the same device, and need not be connected by a network.

In operation 410, a probe (e.g., being executed on a first device such as a device 100) monitoring, associated with or part of the source entity may create or construct an identifier or data relating to the identity of the source entity, such as a string containing the primary key of the source entity, and add to or insert into the message, or associate with the message, the identifier, for example in a correlation string. The probe may intercept the message just before it is sent by the entity. The probe may in some configurations intercept the message after it is sent by the source entity but before it leaves the hardware device of the source entity. Alternately the probe may intercept the message at any other time before it arrives at its destination (for example, operation 410 may be performed after operation 420). The probe may insert the identity data into the message by being part of the code or process of the source entity. For example, instrumentation or other code within the entity may, at the time a call is made to send the message, include the identifier (e.g. a primary key) in the call. Alternately the probe may access the message by other methods. While in some embodiments entities on different devices or hardware may be monitored, in other configurations the entities may be on the same hardware. In such a case the message may not actually leave the hardware, and/or the call may be internal.

The identifier may include for example a primary key based on a preexisting name or identity data for the entity and other information. A unique identifier may be created based on a combination of elements or identifier fields such as descriptions and associations for the entity (e.g., preexisting name, associated port, associated queue, associated host). The associated host may be the device which executes the process or entity. The name may be based on the executed instance of the entity or process.

The identifier may be or include the name of the source entity (e.g., a preexisting name), a root method name and arguments. If the entity is, for example, a web service, the identifier or primary key may include fields such as web service name, web service operation, web service namespace, web service port, and the host (e.g., device or processor) on which it executes (e.g., "host1.myCorp.com"). In such a case a correlation string may be, for example, "WebServiceNameA&WebServiceOpA&WebService NSA&WebServicePortA&host1.myCorp.com"), where the identifier fields or elements in this example are separated by ampersands ("&"). An entity may be identified using fields such as fully qualified host name and port number (resulting in a correlation string such as, for example, "myHost.myCorp.com&8080"). Other formats and other separators may be used.

In one embodiment, a difference in any of the elements for the entity means that a different entity is being referred to.

The identifier may be added to a message as a correlation string, but other structures may be used. The identifier may also be sent separately from the message, e.g., not within the message. In one implementation, identification or name data may be inserted in different places for different entities or different communication protocols. For example, if the message is in Hypertext Transfer Protocol (HTTP) format or Java Message Service (JMS) format, an extra header may be used.

Other data may be reported along with the correlation string, such as network diagnostic data (e.g., timing, latency, or other data). In some embodiments such other data may be reported separately.

In operation 420, the source entity may send or transmit the message to the destination entity. The message typically includes in addition to the identification or name data, operational data, such as a request, data in answer to a request, or any other data passed between entities connected by a network. Typically the operational data is used by the receiving entity or process.

In operation 430, the destination entity may receive the message sent from the source entity, e.g., a message transmitted across a network such as one or more of networks 170. The destination entity may use the operational data as it normally uses operational data.

In operation 440, the probe associated with the destination entity may create an identifier for the destination entity In operation 450, the probe associated with the destination entity may send or transmit the identification data for the source and destination entities and possibly other data to a central server or central process (e.g. topology tool 200). Since, in various embodiments, the probe may be integrated within an associated entity process, when discussed herein receiving a message from a probe and receiving a message from an entity may be used interchangeable, the actual sending process depending on the specific implementation. In one embodiment a first probe, associated with a sending process, does not send any identification data to a central server; rather a second probe, associated with a receiving process, sends the identification for both the sending and receiving entities to the central server.

Figure 5A:
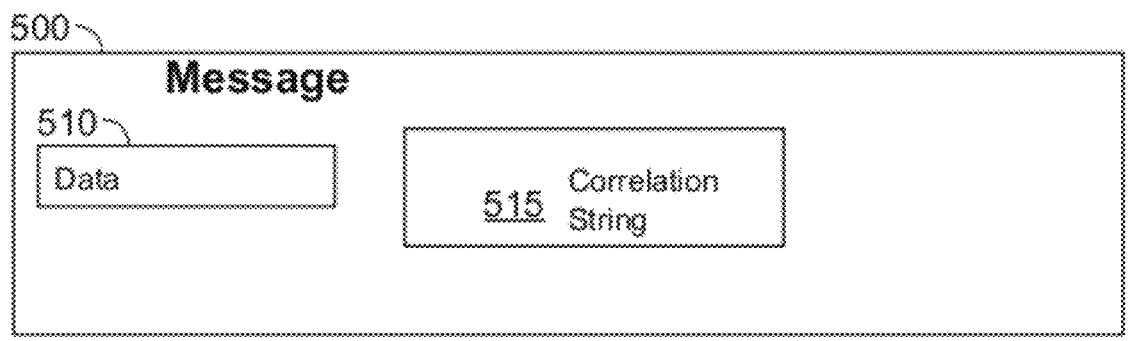
FIG. 5A is a schematic diagram of a message passed between entities according to embodiments of the invention.
Figure 5B:
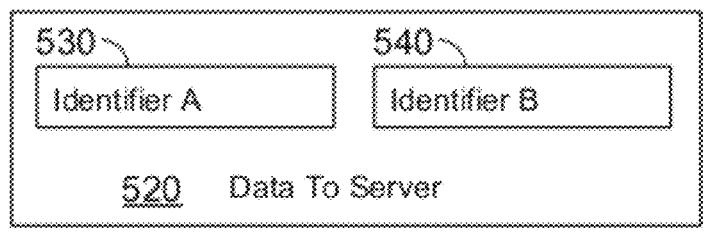
FIG. 5B is a schematic diagram of data sent to a server, according to embodiments of the invention.

FIG. 5A is a schematic diagram of a message passed between entities according to embodiments of the invention. Message 500 passed from entity A to entity B may include operational data 510, e.g. data produced by the sending process or entity, such as a request to the receiving entity, a database query response, data being sent to a web page, voice or video data, or any other data exchanged between entities. The operational data may be intended to be used by entity B, e.g. the receiving entity or process. Data 510 may be the data and the form of the message if a probe according to an embodiment of the invention does not augment the message. Message 500 may include a correlation string 515, or another set of data, identifying the transmitting entity. In FIG. 5A, correlation string 515 includes identification data such as a primary key for entity A. FIG. 5B is a schematic diagram of data sent to a server (e.g., by entity B), according to embodiments of the invention. In FIG. 5B identification data 520 sent to a server includes identification data 530 for entity A and identification data 540 for entity B. In other embodiments, identification or name data for entities may be sent in a data structure other than a correlation string. Message 500, correlation string 515 and data 520 may be for example data stored in the various physical structures described herein, and transmitted between devices and processes described herein.

In operation 460 the central server or central process receives the identification data and possibly other data. The identifier for the source entity is typically sent from the probe associated by the source entity to the destination entity and then sent, typically unchanged, by the probe associated with the destination entity, to the central server or process.

In operation 470 the central server may use the identification data to look up or search for the entities in a database at the central server (e.g., entity database 230). Typically, entities are known to the server prior to any interaction between entities, as the entities report data separately from inter-entity communications to the central server. However, in some embodiments, an entity may be unknown to a central server prior to inter-entity communication. In performing this lookup, the central server may compare the identifiers to identifiers in a database held by or maintained by the central server. A match between identifiers and a maintained record may indicate that the associated entities are known to the central server and part of a connection (e.g., a network connection, and/or a connection or an exchange of messages between entities).

In operation 480 the central server may add connection data for the entities to, for example, a record or entry in a database or other structure storing connection data (e.g., topology database 240). In determining if a set of identifiers belong with a particular record, the central server may compare or match the identifiers to identifiers in a database held by or maintained by the central server. A match between identifiers and a maintained record may indicate that the associated entities have a connection, e.g., a connection in a maintained record. If no match is found to a record (in for example a topology database) where all identifiers received match all identifiers in a record, a record may be created. Each record recording a network connection (e.g., a network connection) between entities or processes may include, for example, identifiers for the entities or processes, and possibly other information. For example, the record may include performance metrics, latencies, or trends relating to the connection, the number of messages or interactions from probe processes received for or describing that pair (e.g., including identifiers for each entity in the pair). Such a record may indicate the number of messages exchanged by the pair. In some embodiments a topology database holds links pointing to the real entities in an entity database to avoid duplication of the primary keys in more than one database. When used herein, recording an identifier may include recording a link to an identifier.

In one embodiment, one connection entry is created for each connection, or for each set of entities communicating, exchanging messages, or otherwise connected. When multiple messages from probes are received (e.g., over time) indicating communications or a connection between the same set of entities, the connection entry may be updated with the new data, rather than being duplicated. However, other methods may be used. For example, multiple entries may be created, one for each interaction between the entities. A connection entry may include for example the entities that are connected, information describing the entities, and other information, for example timing information regarding the connection, latency information, etc.

Operations 400-480 may continue to determine the entity topology for, for example, as long as a user or administrator requests or directs.

In operation 490 a report may be generated and/or stored and/or displayed to a user, e.g., on a monitor 214. The report may include or visualize, for example, the connections and communications detected in steps 400-480. A report may include for example a topology (e.g. an entity topology or network topology) or a graphical chart showing entities with links or arrows between entities indicating connections between entities, or indicating which entities are connected. Indicating on (e.g., clicking on using a pointing device) an entity or link may allow detailed information regarding the entity or link to be displayed (e.g., "drilling down"). Information shown may include the number or volume of communications on a connection or link between entities, latency, etc.

Operation 490 may be performed at the end of a collection process, or at any time a user or administrator requests, while data is being collected (while operations 400-480 are taking place), or continually. Operation 490 may be performed while the network or the communications among entities continue to operate; in such a case the actual topology may develop and change while the report is fixed or displayed. The report or topology may be updated as the actual topology changes.

Other operations or series of operations may be used.

A probe process or code may perform additional functions, such as reporting to a central server performance data, latency data, or other network monitoring data.

Creating a correlation string or an identifier using an ad-hoc and non-centralized approach as in the prior art may result in mis-matches, mis-identification of processes, false negatives and false positives. Complications may arise due to a non-standardized format for strings. In some embodiments of the present invention, correlation strings or identifiers based on the identifier of an entity may be easier and less computationally and memory burdensome to use than, for example, a unique correlation string created by a central process in a network, such as a random identifier generated by a central process. Identifiers based on the identity of the entity may be more accurate than correlation strings created ad-hoc or locally by entities using for example random identifiers, as duplicate ad-hoc identifiers may be created by entities across a network, resulting in false positives, where unconnected entities are improperly matched. Ad-hoc or locally created random identifiers may create more computational burden, as it may be harder for a central process to store and match such identifiers to determine which communications have taken place. In addition, such identifiers may result in false negatives, where connected entities are not properly matched. Adding or extending an embodiment of the present invention for use with additional systems or protocols may be easier than with present systems, as the convention for the contents of correlation strings in some embodiments of the present invention remains constant or relatively constant across different systems and entities.

Embodiments of the present invention may include apparatuses for performing the operations herein. Such apparatuses may be specially constructed for the desired purposes, or may comprise computers or processors selectively activated or reconfigured by a computer program stored in the computers. Such computer programs may be stored in a computer-readable or processor-readable storage medium, such as, but is not limited to, one of memories 120 or 220 or storage devices 116 or 216, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a computer or processor readable storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Features of various embodiments discussed herein may be used with other embodiments discussed herein. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method comprising:
at a third computing device which is connected to a network, wherein a first computing device executing a first process monitored by a first probe process is connected to the network, and a second computing device executing a second process monitored by a second probe process is connected to the network:
receiving a message from the second probe process, the message comprising an identifier for the first process and an identifier the second process;
updating a record recording a connection between the first process and second process, said record being previously stored in a database operably connected to said third computing device; and
creating a topology from said message.

2. The method of claim 1 wherein the record recording a connection between the first process and second process comprises the identifier for the first process and the identifier for the second process.

3. The method of claim 1 wherein the record recording a connection between the first process and second process comprises an indication of the number of messages received by the third computing device which include the identifier for the first process and the identifier for the second process.

4. The method of claim 1 comprising creating a topology based on the record recording a connection and a plurality of other records recording other connections.

5. The method of claim 4 wherein the topology indicates which entities are connected.

6. The method of claim 1 wherein the identifier for the first process is unique across the network.

7. The method of claim 1 wherein the identifier for the first process comprises at least two elements from the group consisting of: a name of the first process, a process argument, a service name, a service operation, a port, and the host name of the first computing device.

8. A system comprising:
a central computing device which is connected to a network, wherein a first computing device executing a first process monitored by a first probe process is connected to the network, and a second computing device executing a second process monitored by a second probe process is connected to the network, the central computing device comprising:
a memory to store records recording connections between processes; and
a processor to:
receive a message from the second probe process, the message comprising an identifier for the first process and an identifier for the second process;
update a record in the memory recording a connection between the first process and second process, said record being previously stored in a database operably connected to said central computing device; and
create a topology based on said message.

9. The system of claim 8 wherein the record recording a connection between the first process and second process comprises the identifier for the first process and the identifier for the second process.

10. The system of claim 8 wherein the record recording a connection between the first process and second process comprises an indication of the number of interactions between the first process and the second process.

11. The system of claim 8 wherein the processor is to create a topology based on the record recording a connection and a plurality of other records recording other connections.

12. The system of claim 11 wherein the topology indicates which entities are connected.

13. The system of claim 8 wherein the identifier for the first process is unique across the network.

14. The system of claim 8 wherein the identifier for the first process comprises at least two elements from the group consisting of: a name of the first process, a process argument, a service name, a service operation, a port, and the host name of the first computing device.

* * * * *